Figure 4:
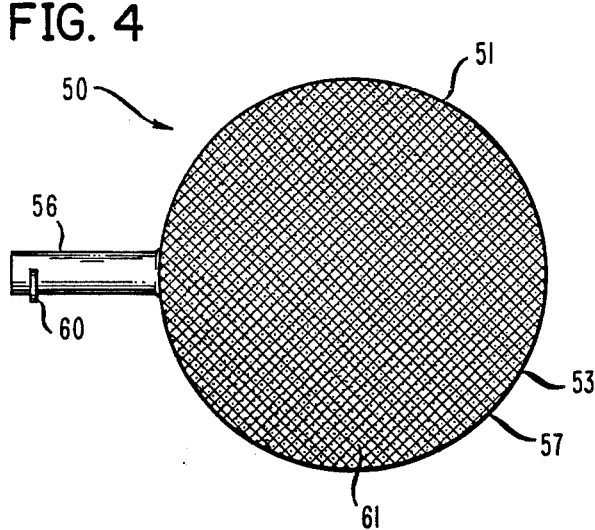

United States Patent [19]

Davis et al.

[11] Patent Number: 4,946,478

[45] Date of Patent: Aug. 7, 1990

[54] PARTICULATE COLLECTION AND DEWATERING MEANS FOR AIRBORNE PARTICULATE MATTER

[75] Inventors: Charles Davis, Brick Town; Robert A. Kennedy, Mendham, both of N.J.

[73] Assignee: Aaxon Industrial, Inc., Avenel, N.J.

[21] Appl. No.: 351,836

[22] Filed: May 15, 1989

[51] Int. Cl.$^5$ ............................................. B01D 46/00
[52] U.S. Cl. ........................................ 55/97; 55/356; 55/364; 55/429; 383/102; 383/103
[58] Field of Search ................ 55/97, 315, 356, 364, 55/171, 185, 429, 430, 467; 383/102, 103

[56] References Cited

U.S. PATENT DOCUMENTS

| | | | |
|---|---|---|---|
| 1,504,136 | 8/1924 | Patterson et al. | 55/364 |
| 3,364,658 | 1/1968 | Walker | 55/171 |
| 3,757,957 | 9/1973 | Smith | 55/364 |
| 4,086,070 | 4/1978 | Argo et al. | 55/97 |
| 4,343,630 | 8/1982 | Grant | 55/185 X |
| 4,718,925 | 1/1988 | DeMarco | 55/429 X |
| 4,820,315 | 4/1989 | DeMarco | 55/429 X |
| 4,828,187 | 5/1989 | Davis et al. | 55/356 X |

Primary Examiner—Charles Hart
Attorney, Agent, or Firm—Clifford G. Frayne

[57] ABSTRACT

An apparatus and process for the collection of airborne particulate matter in combination with a fluid, the airborne particulate matter and fluid being collected in a collection chamber under negative pressure, the collection chamber having a disposal bag complimentary secured within the chamber, the disposal bag having a fluid porous bottom, the collection chamber having a drain valve disposed at its lower most point, the disposal bag and collection chamber being subjected to either positive pressure or a vacuum at the drain valve to remove fluid from the collected particulate matter prior to disposal of the particulate matter.

14 Claims, 4 Drawing Sheets

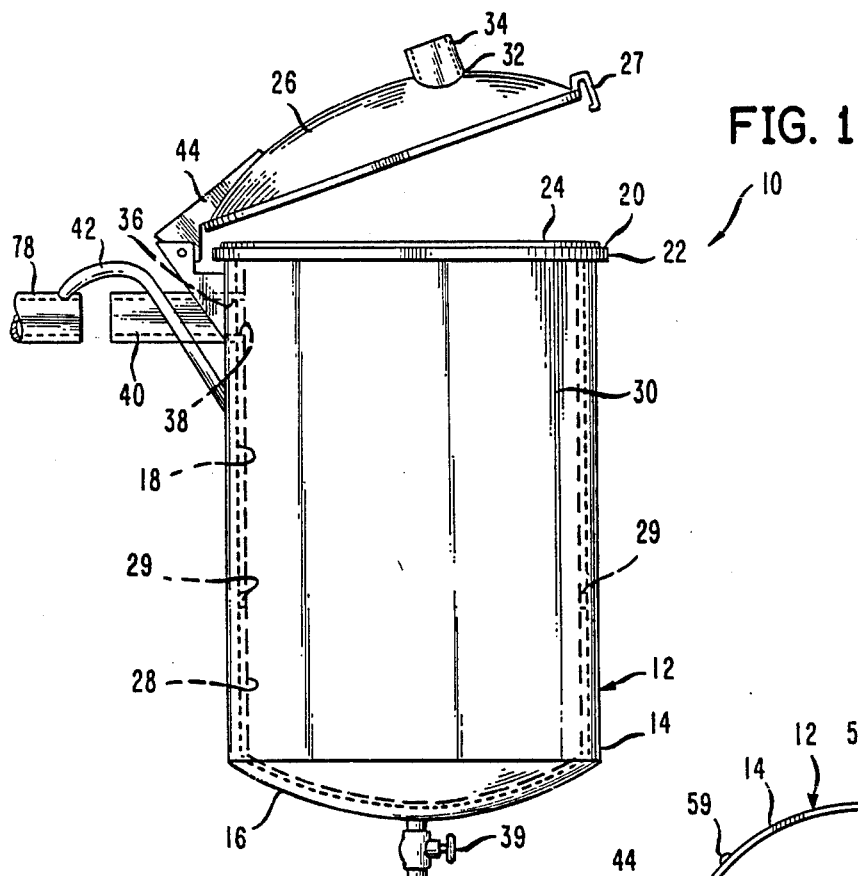
FIG. 1
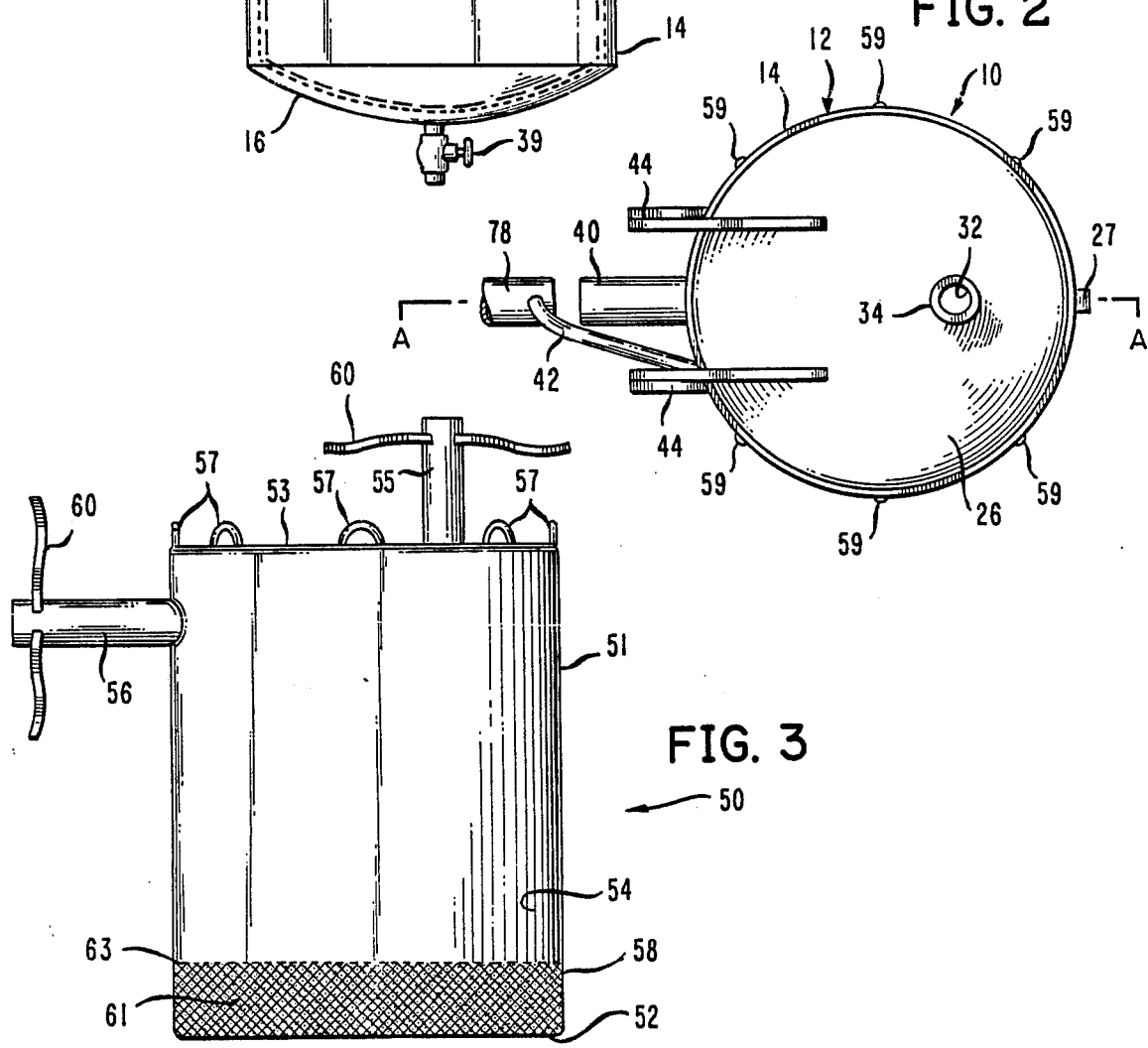
FIG. 2
FIG. 3

PARTICULATE COLLECTION AND DEWATERING MEANS FOR AIRBORNE PARTICULATE MATTER

FIELD OF INVENTION

This invention relates to a collection means for collecting airborne particulate matter from an airstream where the airborne particulate matter may have been wetted in order to enhance the collection process or the particulate matter is initially wet and the liquid is required to be withdrawn from the collected particulate matter prior to disposal.

BACKGROUND OF THE INVENTION

Vacuuming apparatus for the collection of particulate matter are becoming increasingly important to the maintenance of environmental quality. In many instances, the collection of particulate matter under a vacuum or a negative pressure collection means represents the most economical and most expedient manner in which large areas can be cleaned.

Depending upon the particulate matter being collected, emphasis on the collection means requires that the particulate matter once introduced into the collection means does not escape into the ambient atmosphere. The applicant has been involved in various environmental cleanup situations wherein the particulate matter being collected was of a hazardous nature such as asbestos fiber and loose soil impregnated with dioxin. In developing means for dealing with hazardous waste cleanups of this nature, applicant has developed several apparatus and processes detailed in U.S. Pat. No. 4,490,162 and in U.S. Pat. No. 4,828,187.

In order to ensure collection of the particulate matter in the airstream, it is oftentimes necessary to wet the particulate matter in the airstream to ensure collection under the influence of gravity in collection chambers. This wetting increases the effectiveness of the collection system. With respect to hazardous materials, in order to ensure no escape to the ambient atmosphere once collected, the hazardous particulate matter together with the moisture introduced into the airstream to collect the hazardous particulate matter is disposed of in the collection chamber. The collection chamber must therefore be of a construction and quality to ensure that once the hazardous particulate matter is collected within the chamber, the hazardous particulate matter will not escape during the disposal process.

There are environmental cleanup situations in which the particulate matter being collected is not of a hazardous nature, yet wetting of the particulate matter in the airstream increases the efficiency of the collection process. However, it is desirable to remove the moisture from the collected particulate matter before the particulate matter is disposed.

Applicant's bag disposal means as disclosed in U.S. Pat. No. 4,828,187, disclose a bag disposal means which allows for the collection of particulate matter, including hazardous particulate matter in a bag means supported by a chamber, the airstream being introduced into the bag disposal means for collection of particulate matter under the influence of gravity. Applicant's device provided for a sealing mechanism which ensure that none of the collected hazardous particulate matter would escape to the ambient atmosphere once collected in the bag means. Applicant's airstream when collecting hazardous particulate matter had the option of being wetted or nonwetted. Since Applicant was dealing with hazardous particulate matter, the moisture introduced into the airstream and the hazardous particulate matter were disposed of in the bag disposal means to prevent escape of the hazardous particulate matter.

In circumstances in which particulate matter which is not hazardous is being collected, the wetting of the air-stream will increase the efficiency of the collection process; however, in order to be able to collect an increased amount of particulate matter without sacrificing volume to the moisture introduced into the airstream, it is desirable to be able to remove the moisture from the particulate matter which is collected without permitting the escape of the particulate matter. Applicant has achieved this goal with a modification of Applicant's bag disposal means as disclosed in U.S. Pat. No. 4,828,187 the improvement comprising a redesigned chamber and bag disposal means for use with an airstream for the collection of particulate matter and fluid in which it is desirable to remove the fluid.

Additionally, the disposal bag disclosed herein can be used with respect to the collection of hazardous particulate matter which contains moisture. The operation of the bag would be identical, however, in disposing of the bag as disclosed in the detailed specification herewith, the collection disposal bag having a porous bottom would have to be encapsulate in a second, nonporous bag once it was filled and drained of moisture in order to prevent the escape of the hazardous particulate matter. The invention disclosed herein would have application to hazardous particulate matter in that it would be advantageous to dispose of as much of such hazardous particulate matter in a single disposal bag without having the volume of the bag occupied by moisture. Additionally, the invention disclosed herein can be utilized for the collection of particulate matter and light solids which are mixed with fluid in a slurry-type state such as slurry tanks or sewers where the material is of such a character as to be susceptible to transport under a negative pressure situation. These and other characteristics of the disposal bag and its operation are disclosed in the detailed specification herewith.

OBJECTS OF THE INVENTION

It is the primary object of the present invention to provide for a novel and improved separation chamber for the collection of airborne particulate matter from the air-stream and the removal of any moisture associated with the collected particulate matter.

It is yet a further object of the present invention to provide for a novela nd improved separation chamber which collects and compresses the particulate matter as a result of the negative pressure of the air-stream and permits the removal of moisture from the collected particulate matter.

It is still a further object of the present invention to provide a novel and improved separation chamber in combination with a novel bag design to secure the integrity of the collected particulate matter and prevent its discharge into the ambient atmosphere yet permit the removal of moisture content from the collected particulate matter.

It is still a further object of the present invention to provide a novel and improved separation chamber for the collection of particulate matter in a liquid slurry and separation of the solid particulate matter from the liquid for further disposal in the same collection chamber.

SUMMARY OF THE INVENTION

The separation chamber for the separation of particulate matter in an airstream and the subsequent removal of moisture associated with said particulate matter in the air-stream which comprises a solid walled container vessel having a removably sealable top having an inlet port, the chamber having an inner perforated screen wall with an outlet portion positioned on the side of the vessel extending to the interior of the perforated screen inner wall, a static vacuum line communicating with the outlet line and the annular space between the solid outer container wall and the inner perforated screen wall, and a self-contained disposal bag having an inlet sleeve and an outlet sleeve, said bag design to conform to the contours of the inner perforated screen wall and the inlet sleeve for extending through the inlet port and the outlet sleeve for extending through the outlet port, the sleeves having a means for securing the sleeves in the closed and secured position once the disposal bag has become filled with particulate matter, the disposal bag having an impervious top and side-walls and a porous bottom wall for the passage of liquid, the separation chamber having a drain valve positioned at its lower most point for the collection of liquid removed from the bag under the influence of positive pressure introduced into either the inlet port or outlet port of said separation chamber.

BRIEF DESCRIPTION OF THE DRAWINGS

These and other objects of the present invention as well as the novel features thereof will become more apparent by reference to the following description, particularly when taken in conjunction with the accompanying figures in which:

FIG. 1 is a side elevational view of the container vessel;

FIG. 2 is a top view of the container vessel.

FIG. 3 is a side view of the disposal bag;

FIG. 4 is a bottom view of the disposal bag;

FIG. 5 is a side elevational, cutaway view along plane A—A of FIG. 1 of the container vessel containing the disposal bag.

FIG. 6 is a side elevational, cutaway view along plane A—A of FIG. 1 showing the container vessel and disposal bag with particulate matter.

FIG. 7 is a schematic diagram illustrating the process for particulate collection and dewatering.

DETAILED DESCRIPTION OF THE DRAWINGS

Referring to FIG. 1, this is a side elevational view of separation chamber 10. Separation chamber 10 comprises a container vessel 12 having a solid impervious sidewall 14, a lower solid, impervious end portion 16 secured to the side-wall, defining an inner chamber 18. Lower end portion 16 is slightly concave from inner chamber 18. Upper end 20 of separation chamber 10 is open and has an annular flange 22 about said opening for receipt of a sealing gasket 24. Sealing gasket 24 cooperates with lid 26 for effectuating a closure seal when lid 26 is secured to separation chamber 10 in a closed position by means of locking lever 27. Lid 26 is also designed to be slightly concave outwardly from the inner chamber 18.

There is secured within separation chamber 10, an inner wall comprising a perforated screen 28 which substantially conforms to the inner dimensions of separation chamber 10 and provides an annular space 30, between side-wall 14 and perforated screen 28 and a cavity between lower end portion 16 of separation chamber 10 and perforated screen 28. Perforated screen 28 is secured within separation chamber 10 by means of a plurality of securing mounts 29 which maintain the positioning of perforated screen 28 in relationship to side-wall 14 and lower end portion 16.

An inlet port 32 is formed in lid 26 and has secured thereto, a vertical inlet conduit 34. An outlet port 36 is formed in sidewall 14 coincidental with an outlet port 38 in perforated screen 28 and there is secured thereto, a horizontal outlet conduit 40, the end of which terminates at perforated screen 28. Inlet port 32 and outlet port 36 define the inlet and outlet for the airstream and particulate matter. Secured to bottom wall 16 is a fluid outlet port 39 for removal of water, moisture or fluid in the airstream and particulate matter as described hereafter.

A vacuum conduit 42 as will be more particularly described thereafter communicates between annular gap 30 of separation chamber 10 and the outlet line attached to outlet conduit 40.

Referring to FIG. 2, there is shown a top planer view of the separation chamber showing lid 26, inlet port 32 and inlet conduit 34 and outlet conduit 40 and vacuum conduit 42. In this view, lid 26 has effectuated a seal about annular flange 22 and sealing gasket 24. Further, in this configuration, it can be seen that lid 26 is secured to separation chamber 10 by means of a pair of hinge mechanisms 44, one of the hinge mechanism secured to side-wall 14 and the second hinge member secured to lid 26. This permits lid 26 to be rotated between an open position as shown in FIG. 1 and to a closed position as shown in FIG. 2 and secured by locking lever 27.

Referring to FIG. 3, there is shown a side elevational view of the disposal bag 50. Disposal bag 50 in this configuration is constructed of polypropylene of a strength of 6-½mil. Disposal bag 50 comprises a side-wall 51, a lower end 52 secured to side-wall 51 and an upper end 53 secured to side-wall 51. Side-wall 51 and lower end 56 and upper end 53 define an inner chamber 54. In this embodiment, upper end 53 has an inlet sleeve 55 secured thereto and in communication with inner chamber 54 and side-wall 51 has an outlet sleeve 56 secured thereto, also communicating with inner chamber 54. Lower end 52 and a portion of circumferential sidewall 51 adjacent lower end 52 comprise a porous polypropylene material 61 joined to impervious upper portion 51 of disposal bag 50 at seam 63.

Disposal bag 50 is designed to be inserted into separation chamber 10 with an inlet sleeve 55 being coincidental with inlet port 32 and inlet conduit 34 and outlet sleeve 56 being coincidental with outlet port 38 and outlet conduit 40. In this configuration, sleeves 55 and 56 respectively are pulled through the respective inlet and outlet conduits and lid 26 would then be secured to separation chamber 10. Sleeves 55 and 56 would then be rolled back upon the respective inlet and outlet conduit and these conduits would then be secured to extension conduits leading to the area where the particulate matter is being removed and from the outlet conduit to the additional separation means achieving 3 micron particulate filtration.

Disposal bag 50 has disposed about upper end 53 a plurality of U-shaped straps 57 which overlap side-wall 14 at upper end 20 and are secured to a plurality of securing hooks 59 disposed about the exterior of sidewall 14. In this manner, disposal bag 50 is maintained in position within separation chamber 10 while inlet sleeve 55 and outlet sleeve 56 are positioned.

As will be discussed hereafter, disposal bag 50 may be removed from chamber 10 by a variety of means; however, the plurality of U-shaped straps 57 will permit the vertical lifting of disposal bag 50 from chamber 10.

U-shaped straps 57 which overlap side-wall 14 are of such a thickness so as not to interfere with the closure of lid 26 and as such, did not interfere with the seal between lid 26, sealing gasket 24 and container vessel 12.

FIG. 4 is a bottom view of the disposal bag 50 showing outlet sleeve 56 and the fluid porous material 61 comprising bottom wall 51.

Figure 5:
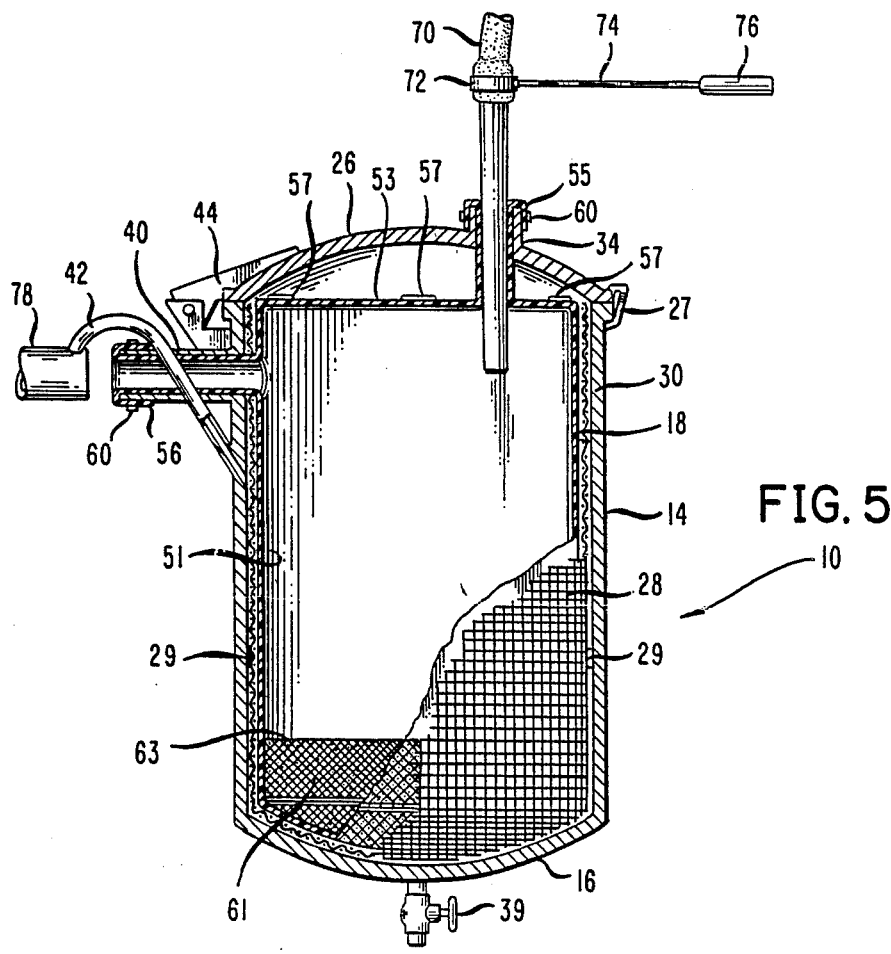

The present embodiment of disposal bag 50 in cooperation with separation chamber 12 is shown in FIG. 5 which is a cutaway side elevational view of separation chamber 12 along plane A—A of FIG. 2. In this configuration, describing the loading procedure, lid 26 would be rotated to an open position with disposal bag 50 positioned within container vessel 12. U-shaped strap 57 would be extended over securing hook 59 to maintain disposal bag 50 in a substantially upright position. Outlet sleeve 56 would be extended through outlet port 38 and outlet conduit 40 and is of such a length to permit outlet sleeve 56 to be folded back over the exterior circumference of outlet conduit 40. Inlet sleeve 55 would be in alignment with inlet port 32 in lid 26 and inlet conduit 34 such that inlet sleeve 55 is extended upwardly through inlet port 32 and inlet conduit 34 and again, is of such a length to permit the inlet sleeve 55 to be folded backward along the outer circumference of inlet conduit 34. In this manner, lid 26 is lowered to a sealed position, locking lever 27 securing lid 26 to container vessel 12. Inlet conduit 34 is then secure to inlet piping 70 which inlet piping 70 is in communication with a vacuum means. The vacuum means may be in close proximity to the separation chamber or several hundred feet away depending upon the location of the particulate matter to be collected. The particulate matter may be dry or wet, or slurried. If the particulate matter is of a dry nature, collection is enhanced by wetting the dry material prior to collection. In such instances, an optional wetting collar 72 is positioned in inlet piping 70 proximate to container vessel 12. Wetting collar 72 comprises a wetting ring 70 having a plurality of radially spaced orifices which permit the injection of water or other encapsulants into the gaseous airstream in order to wet the particulate matter. The wetting collar 72 is fed by a conduit means 74 connected to a pump means 76 and a water supply source.

Inlet piping 70 is secured to inlet conduit 34 in order to ensure that collected particulate matter is not vented to the ambient atmosphere. Depending upon the nature of the particulate matter collected, the depth of insertion of inlet pipe 70 into container vessel 12 is varied. Similarly, outlet conduit 40 is secured to an outlet pipe 78 which is in communication with downstream filtration devices if required, for the further filtration of particulate matter in the airstream.

In the startup operation, a vacuum pump would create a negative pressure throughout the system, the input to the system being the vacuum nozzle at the extreme terminus of inlet piping 70. The commencement of gaseous airflow and particulate matter through the separation chamber 10 expands disposal bag 50 against perforated screen 28. Perforated screen 28 maintains disposal bag 50 in a substantially expanded form and at the same time, prevents disposal bag 50 from being sucked from internal chamber 18 into outlet conduit 40.

Figure 6:
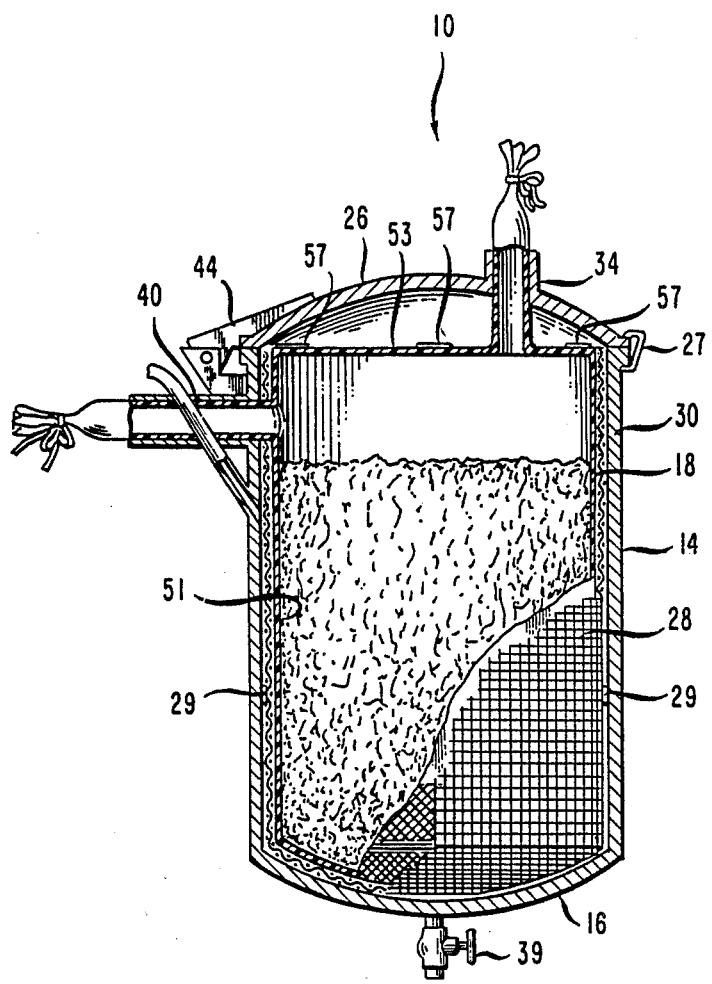
Figure 7:
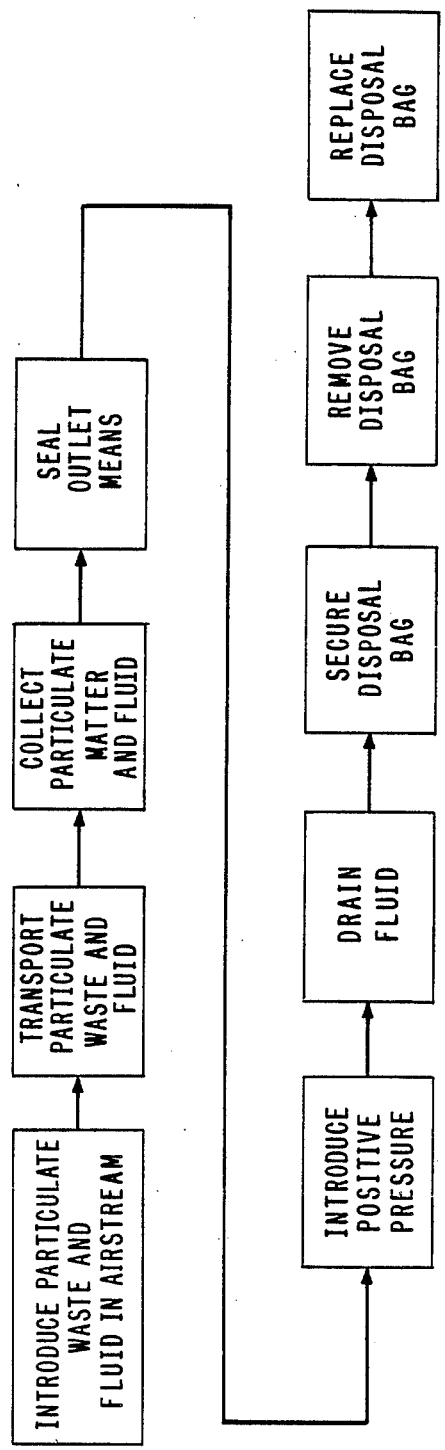

The gaseous airstream under negative pressure in inlet conduit 70 decreases slightly in negative pressure upon its entrance into inner chamber 18 of container vessel 12 and negative pressure increases upon its exit through outlet conduit 78. Vacuum conduit 42, which communicates between outlet conduit 78 and annular space 30, permits annular space 30 to be subjected to the negative pressure in outlet conduit 78 due to the velocity of the gaseous airstream, thus creating a pressure differential in container vessel 12 between the gaseous airstream and disposal bag 50 and annular space 30 thereby contributing to the expansion of disposal bag 50 and its maintenance in a substantially expanded state. The dry particulate, wetted if necessary, or the particulate matter and fluid entering the system through the vacuum nozzle, settle in disposal bag 50 under gravitational influence as a result of the temporary decrease in pressure. FIG. 6 shows the collection of particulate matter within disposal bag 50. After disposal bag 50 is substantially full with particulate matter and fluid, the negative pressure is terminated. At that point, the operator has the opportunity to remove the fluid collected with the particulate matter by one of several alternatives. Inlet port 34 or outlet port 40 would be sealed off and a positive pressure introduced through the remaining opening port, with drain valve 39 being opened such that the positive pressure would drive the fluid collected with the particulate matter downwardly through fluid porous bottom wall 52 of disposal bag 50 and out through drain valve 39 for collection or further treatment. In the alternative, the operator could also open drain valve 39 and simultaneously draw a vacuum through drain valve 39 thereby draining the fluid from disposal bag 50 through porous bottom wall 52 and out through drain valve 39.

Once the fluid or moisture was removed from the collected particulate matter, inlet sleeve 55 and outlet sleeve 56 would be secured by drawstrings 60 as shown in FIG. 6 and lid 26 would be rotated for removal of the disposal bag. The removal of the disposal bag could be accomplished by mounting the entire container vessel on a fulcrum and pivoting the container vessel so that disposal bag 50 would slide from container vessel 12 or bag 50 could be lifted by means of U-shaped straps 57.

If the particulate matter collected in disposal bag 50 were not of a hazardous character, the disposal bag as removed from container vessel 12 could be disposed of in a landfill without further treatment. If the particulate matter collected was of a hazardous nature, it would then be necessary to place disposal bag 50 within another disposal bag or container before disposal in order that there be assurance that no particulate matter of a hazardous character escapes through fluid porous bottom wall 51 upon disposal. The second disposal bag or container would be of a nonporous character.

Vacuum conduit 42 which aids in the maintenance of disposal bag 50 in an expanded position is shown in the embodiment as being secured to the upper circumference of outlet piping 78 and angled downstream. This is designed to prevent the accumulation of particulate matter in vacuum conduit 42.

The position of the inlet conduit and the outlet conduit to container vessel 12 is dictated by the need to use the volumetric capacity of disposal bag 50 to its fullest extent. The inlet conduit and outlet conduit cannot be positioned relatively close to each other as this would result in substantial fly-by of particulate matter.

The dimensions of the disposal bag and collection chamber as disclosed in this embodiment are approximately four feet in diameter and eight feet in height, however, larger or smaller chambers and disposal bags could be designed without departing from the spirit and scope of the invention.

Applicant's use of the separation chamber and disposal bag as shown permits the operation of vacuuming or cleanup of particulate matter and fluid in an efficient manner and permits the operator the opportunity to remove the fluid from the disposal bag prior to its disposal. Depending upon the nature of the particulate matter collected, the fluid removed from the disposal bags through drain valve 39 may be required to be subjected to further treatment.

Applicant's design permits the operator to collect particulate matter which is mixed with fluids or which may be required to be wetted in order to collect, and permits the operator to remove the fluid from the collected particulate matter prior to disposal. This permits the operator greater volumetric capacity with respect to the collection of particulate matter only.

While the present invention has been described in connection with the exemplary embodiment thereof, it will be understood that many modifications will be apparent to those of ordinary skill in the art and that this application is intended to cover any adaptations or variations thereof. Therefore, it is manifestly intended that this invention be limited only by the claims and the equivalents thereof.

I claim:

1. A separation chamber for use in a negative pressure system for the collection of fluid and particulate matter from an airstream and the subsequent separation of said 1particulate matter from said fluid, said separation chamber having: A first chamber defined by an impervious outer wall and an impervious bottom wall secured to said outer wall and an impervious top wall removably secured to said outer wall; a second chamber defined by a perforated inner wall concentric with said outer wall defining an annular space therebetween, said second chamber having a perforated bottom wall secured to said inner wall, said perforated bottom wall secured to said inner wall, said perforated bottom wall in parallel alignment with said impervious bottom wall to define a space therebetween, said second chamber having an open top, said second chamber secured within said first chamber; an admitting means and a first discharge means comprising a means for introduction of said airstream and said particulate matter and said fluid into said first chamber and said second chamber and means for evacuating said gaseous airstream from said first chamber and said second chamber, said admitting means comprising a port means external to said first chamber and said second chamber for introducing said gaseous airstream and particulate matter and said fluid into said second chamber, said first discharge means comprising a port means external to said first chamber and said second chamber for discharging said gaseous airstream from said second chamber; a communication means comprising a conduit communicating with said annular space between said first chamber and said second chamber and said first discharge means, said particulate matter and said fluid accumulated within; a collection means disposed within said second chamber, said collection means comprising;

a resilient disposal bag having an inlet means in alignment with said admitting means in said separation chamber and an outlet means, in alignment with said first discharge means to said separation chamber, said collection means disposed in said second chamber and substantially conforming to the size and shape of said second chamber, said collection means having a fluid porous bottom wall;

a second discharge means comprising a drain port secured to said impervious bottom wall of said first chamber, said second discharge means communicating with said annular space between said first chamber and said second chamber, said second discharge means being selectively open or closed for the discharge of fluid.

2. A collection means for a separation chamber in accordance with claim 1 wherein said inlet means on said collection means comprises a resilient impervious sleeve extending through said inlet port of said admitting means and cuffed about same.

3. A collection means for a separation chamber in accordance with claim 1 wherein said outlet means on said collection means comprises a resilient, impervious sleeve extendable through said outlet port and discharge mans and cuffed about same.

4. A collection means for a separation chamber in accordance with claim 1 wherein said collection means has attached to said inlet means and said outlet means, a means for securing said inlet means and said outlet means in a closed position subsequent to the collection of particulate matter, said securing means comprising tie strings.

5. A collection means in accordance with claim 1 wherein said sleeves and said sidewalls of said collection means are impervious and said bottom wall of said collection means is fluid porous.

6. A separation chamber in accordance with claim 1 wherein said airstream containing said fluid and particulate matter is drawn into said separation chamber through said inlet means by negative pressure for the collection of said particulate matter and fluid in said collection means, said airstream discharged by means of negative pressure through said outlet port.

7. A separation chamber in accordance with claim 1 wherein said accumulated particulate matter and fluid in said collection means is separated by means of the introduction of positive pressure through said inlet port, said second discharge mans selectively opened for the removal of fluid through said fluid porous bottom wall of said collection means in said first chamber, said first discharge means being closed.

8. A separation chamber in accordance with claim 1 wherein said particulate matter and fluid accumulated in said collection means are separated by the selective closure of the inlet port on said first chamber and the drawing of negative pressure through said outlet port thereby discharging fluid from said collection means through said fluid porous bottom wall and second discharge means in said first chamber.

9. A collection means for use in separation chamber operating at negative pressure for the collection of particulate matter and fluid in the gaseous airstream and the separation of said particulate matter and said fluid comprising:

a chamber defined by a resilient, impervious sidewall having secured thereto a resilient, impervious top wall and a resilient, fluid-porous bottom wall;

an admitting means and a discharging means for admitting a gasseous airstream and particulate matter and fluid into said chamber and discharging said gaseous airstream from said chamber;

a means for mounting said collection means in an upright expanded position.

10. A collection means in accordance with claim 9 wherein said admitting means comprises an impervious, resilient sleeve in alignment with the inlet port of a separation chamber, said impervious resilient sleeve extendable through said inlet port and cuffed thereabout.

11. A collection means in accordance with claim 9 wherein said discharge means comprises an impervious, resilient sleeve in alignment with the outlet port of said separation chamber, said impervious, resilient sleeve extendable through said outlet port and cuffed thereabout.

12. A collection means in accordance with claim 9 wherein said admitting means is secured to said impervious, resilient top wall of said chamber and said discharge means is positioned in said impervious, resilient sidewall of said chamber, proximate to said top wall.

13. A collection means in accordance with claim 9 wherein said fluid porous bottom wall is substantially impervious to the passage of particulate matter yet fluid porous for the passage of fluid under the influence of positive pressure introduced through said admitting means.

14. A process for collecting and disposing of particulate waste and fluid in an airstream operating under negative pressure comprising:

a. Introducing the particulate waste and fluid into a gaseous airstream under negative pressure;

b. Transporting said gaseous airstream and particulate matter and fluid to a separation chamber;

c. Introducing said particulate matter and said fluid into said separation chamber having disposed therein, a self-contained disposal bag for the accumulation of particulate matter and fluid, said separation chamber and disposal bag having coincident inlet means and coincident outlet means, said disposal bag having an impermeable sidewall and top wall and a fluid porous bottom wall;

d. Collecting said particulate waste and said fluid in said disposal bag;

e. Discharging said gaseous airstream from said disposal bag in said separation chamber through said outlet means;

f. Disconnecting said outlet means from said separation chamber and said disposal bag and securing said outlet means in a closed position;

g. Introducing positive pressure through said inlet means of said separation chamber and said disposal bag means;

h. Draining said fluid from said particulate waste in said disposal bag means under the influence of said positive pressure through said fluid porous bottom wall of said disposal bag means and drain valve positioned at the bottom of said separation chamber;

i. securing said inlet means of said disposal bag in a closed position;

j. Removing said disposal bag from said separation chamber for disposal;

k. Replacing said disposal bag in said separation chamber;

l. Repeating steps a through k.

* * * * *